United States Patent Office 3,751,499
Patented Aug. 7, 1973

3,751,499
HYDROGENATION PROCESS
James J. Tazuma, Stow, Vipin M. Kothari, Akron, and Robert A. Kumse, Barberton, Ohio, assignors to The Goodyear Tire & Rubber Company, Akron, Ohio
No Drawing. Filed May 5, 1972, Ser. No. 250,802
Int. Cl. C07c 3/00
U.S. Cl. 260—666 A        8 Claims

ABSTRACT OF THE DISCLOSURE

This invention is an improvement in the process whereby cyclopentadiene is continually reduced to cyclopentene by passing the hydrocarbon along with hydrogen over a catalyst comprising palladium on alumina at temperatures from about −10° C. to about 150° C. and pressures from about 0 pounds per square inch to about 1000 pounds per square inch gauge (p.s.i.g.), the improvement being that the reactor is flooded with the cyclopentadiene hydrocarbon.

---

This invention relates to an improved process for the hydrogenation of hydrocarbons. Specifically, it relates to an improved process for the hydrogenation of cyclopentadiene to cyclopentene.

The selective reduction of dienes to olefins by the use of palladium on alumina catalyst is well known in patent and processing literature. Most of these prior art techniques of hydrogenation deal with acyclic dienes such as butadiene, isoprene and piperylene. The selective reduction of cyclopentadiene to cyclopentene using nickel catalysts in the presence of various compounds has also been described in the literature. Although many different processes and catalysts have been reported, the most promising, practical and efficient process is that based on the palladium on alumina catalyst.

Normally, in the hydrogenation of hydrocarbons, the "trickle" bed method is employed. In the trickle bed method of hydrogenation, the hydrocarbon to be hydrogenated is allowed to trickle down the reactor through the catalyst along with the hydrogen. The advantage of the trickle bed method of hydrogenation is that a thin film of hydrocarbon surrounds the catalyst, this thin film can be readily saturated with hydrogen and as a result, maximum rate of hydrogenation of the hydrocarbon is possible. Until now, there has been no advantage in using the flooded bed and there has been no significant difference in the results.

It is an object of this invention to provide an improved process for the selective hydrogenation of cyclopentadiene to cyclopentene utilizing a palladium on alumina catalyst. It is also an object of this hydrogenation process to provide a high selectivity to the desired product. It is also an object of this invention to provide a novel method used in the hydrogenation.

Accordingly, this invention is an improvement in the process where cyclopentadiene is continually reduced to cyclopentene by passing the hydrocarbon, along with hydrogen, over a catalyst comprising palladium on alumina, at temperatures from −10° C. to about 150° C. and pressures from about zero pounds per square inch to about 1000 pounds per square inch gauge (p.s.i.g.), the improvement being that the reactor is flooded with the cyclopentadiene hydrocarbon.

By using the method employed in this invention, namely the "flooded" bed method, the reduction of cyclopentadiene to cyclopentene selectivity is greatly enhanced. In the "flooded" bed method, the hydrocarbon to be hydrogenated is introduced into the reactor from the bottom so that in actuality the catalyst bed is flooded with the hydrocarbon at all times. By being introduced into what is considered the bottom part of the reactor, the feedstock has to move upward through the catalyst bed and thus must actually flood the reactor until the feed stock level reaches the top part of the reactor where it overflows and goes over into the cooling and catching apparatus. The time the cyclopentadiene feedstock is in the reactor along with the hydrogen and feedstock turbulence is conducive to the greater selectivity of the cyclopentadiene to cyclopentene. The necessary mixing of the hydrocarbon near the catalyst surface to afford the hydrogenation reaction to take place is aided by the passage of excess hydrogen or by the rapid flow of the hydrocarbon upward through the catalyst bed.

When the trickle bed method of hydrogenation was compared with the flooded bed method of hydrogenation using cyclopentadiene as the hydrocarbon to be hydrogenated, the selectivity to cyclopentene was almost 4.5 times greater with the flooded bed method than with the trickle bed method.

Although the hydrocarbon and the hydrogen were employed to give the mixing necessary for increased efficiency of the process, it should be obvious that other methods of agitation and mixing can be employed without going outside the scope of this invention. These methods are not excluded from this invention. Such processes may employ vibrating reactors or other mixing methods.

The catalyst used in the employment of this invention comprises palladium on alumina. The term "catalyst" as used in this invention means both the palladium and the support. The palladium can range from about 0.1 percent to about 5.0 percent by weight of the total catalyst. The preferred range for palladium is from about 0.3 percent to about 0.5 percent by weight based on efficiency and cost. The optimum conditions for hydrogenation vary with each different catalyst used in the hydrogenation. Although the optimum conditions may vary somewhat it has been found that higher pressures, lower temperatures and higher liquid hourly space velocity (LHSV) favor higher hydrogenation percentages and higher selectivity to the desired hydrocarbon.

The pressures generally employed in this invention may range from about zero to about one thousand pounds per square inch gauge (p.s.i.g.). The temperatures may range from about −10° C. to about 150° C. The liquid hourly space velocity (LHSV), which is defined as the volume of feedstock as a liquid per volume of total catalyst passed over or contacting the catalyst per hour, may range from about 0.5 to about 10.

The molar ratio of hydrogen to cyclopentadiene feedstock can also vary with changes in the operating hydrogenation conditions such as pressure, temperature and liquid hourly space velocity.

The molar ratio of hydrogen to cyclopentadiene feedstock can range from about 1.0 to about 50. The preferred molar ratio of hydrogen to cyclopentadiene feedstock is from about 1 to about 25.

Precise operating conditions for the continuous hydrogenation of cyclopentadiene employing the techniques used in this invention cannot be set down since the catalyst purity, size of reactor, rate desired and selectivity of the desired products may vary. As previously stated, it has been found that higher pressures, lower temperatures and higher liquid hourly space velocity (LHSV) favor higher hydrogenation conversion and higher selectivity to the desired product.

EXAMPLE I

Fresh cyclopentadiene, at 25° C. was passed upward through a 10-milliliter tubular reactor filled with five-tenths percent palladium on alumina $5/64''$ spheres. Hydrogen was passed along with the cyclopentadiene at a predetermined rate. The LHSV of the cyclopentadiene feedstock was one, and the molar ratio of hydrogen to cyclopentadiene was 20.

The products were collected at selected intervals in a trap cooled at −80° C. and analyzed by gas chromatography. Conversion and selectivity data are shown in Table 1. Also in Table 1 are conditions and other catalysts used.

TABLE 1

| 10 milliliters catalyst | $H_2$, p.s.i.g. | $H_2$/CPD | LHSV | Temp., °C. | CPD conv., percent | Selectivity, percent | |
|---|---|---|---|---|---|---|---|
| | | | | | | Cyclopentene | Cyclopentane |
| 2.0% Pd/Al$_2$O$_3$ ⅛″ pellets | 500 | 20 | 1 | 25 | 82.0 | 97.0 | 1.0 |
| 0.5% Pd/Al$_2$O$_3$ ⅛″ pellets | 400 | 1.5 | 4 | 20 | 90.0 | 86.0 | 6.5 |
| 0.5% Pd/Al$_2$O$_3$ 5/64″ spheres | 100 | 23 | 1 | 25 | 92.5 | 80.5 | 18.5 |
| | 100 | 4.5 | 1 | 25 | 92.5 | 90 | 7 |
| | *400 | 1.5 | 3 | 25 | 72.0 | 92.5 | 5 |
| 1.0% Pd/Al$_2$O$_3$ ⅛″ pellets | 200 | 3 | 2 | 25 | 80.0 | 92.6 | 1.2 |
| 0.5% Pd/Al$_2$O$_3$ 5/64″ spheres | 500 | 20 | 1 | −5 | 85 | 90 | 6 |
| 0.5% Pd/Al$_2$O$_3$ 5/64″ spheres | 400 | 1.5 | 5 | 20 | 90.0 | 91.8 | 7.7 |
| | 400 | 1.5 | 3 | 25 | 72.0 | 92.5 | 3.6 |

*Catalyst bed 5 milliliters.

As an illustration of the advantage of trickle bed for this particular hydrocarbon, the following table is a comparison of trickle bed hydrogenation with flooded bed hydrogenation to show the improvement of flooded bed hydrogenation over the prior art techniques. These results are set down as comparisons only and are not to be interpreted as setting limitations. These data illustrate how the methods utilized in this invention increase the selectivity to cyclopentene of about 4.5 times.

COMPARISON OF TRICKLE BED VS. FLOODED BED

[Catalyst 0.5%—Pd/Al$_2$O$_3$—5/64″ pellets]

| | LHSV | Pressure* | Temp., °C. | $H_2$/cyclopentadiene | Percent conversion | Percent selectivity cyclopentene |
|---|---|---|---|---|---|---|
| Trickle | 1 | 500 | 25 | 20 | 80 | 20 |
| Do | 1 | 100 | 75 | 20 | 73 | 20 |
| Flooded | 1 | 500 | 20 | 20 | 92 | 90 |
| Do | 1 | 500 | −5 | 20 | 90 | 92 |
| Do | 1 | 100 | −5 | 20 | 41 | 92 |

*Pounds per square inch gauge.

While certain representative embodiments and details have been shown for the purpose of illustrating the invention, it will be apparent to those skilled in this art that various changes and modifications may be made therein without departing from the spirit or scope of the invention.

What is claimed is:

1. In a process in which cyclopentadiene is continuously hydrogenated to cyclopentene by passing the hydrocarbon feedstock, along with hydrogen, over a catalyst comprising palladium on alumina, at temperatures from about −10° C. to about 150° C. and pressure from about zero to about 1000 pounds per square inch gauge (p.s.i.g.), the improvement comprising the catalyst bed being flooded with the cyclopentadiene feedstock.

2. A process according to claim 1 in which the liquid hourly space velocity (LHSV) of the feedstock is from about 1 to about 10.

3. A process according to claim 2 in which the preferred liquid hourly space velocity (LHSV) of the feedstock is from about 3 to about 5.

4. A process according to claim 1 in which the palladium constitutes from about 0.1 percent to about 5.0 percent by weight of the catalyst.

5. A process according to claim 3 in which the preferred amount of palladium constitutes from about 0.3 percent to about 0.75 percent by weight of the catalyst.

6. A process according to claim 1 in which the molar ratio of hydrogen/cyclopentadiene is from about 1 to about 50.

7. A process according to claim 4 in which the preferred molar ratio of hydrogen to cyclopentadiene is from about 1 to about 25.

8. A process according to claim 1 in which the preferred pressure (p.s.i.g.) ranges from about 350 to about 600 (p.s.i.g.).

References Cited

UNITED STATES PATENTS

| 2,360,555 | 10/1944 | Evans et al. | 260—666 A |
| 2,584,531 | 2/1952 | Arnold et al. | 260—666 A |
| 2,793,238 | 5/1957 | Banes et al. | 260—666 A |
| 2,887,517 | 5/1959 | Noeske et al. | 260—666 A |
| 3,565,963 | 2/1971 | Tabler et al. | 260—666 A |

DELBERT E. GANTZ, Primary Examiner

V. O'KEEFE, Assistant Examiner